United States Patent [19]
Gellert

[11] Patent Number: 5,148,594
[45] Date of Patent: Sep. 22, 1992

[54] METHOD OF MANUFACTURING AN INJECTION MOLDING PROBE

[76] Inventor: Jobst U. Gellert, 7A Prince St., Georgetown, Ontario, Canada, L7G 2X1

[21] Appl. No.: 836,352

[22] Filed: Feb. 18, 1992

[30] Foreign Application Priority Data

Dec. 11, 1991 [CA] Canada .................. 2057439-9

[51] Int. Cl.$^5$ .................................... H05B 3/00
[52] U.S. Cl. ........................... 29/611; 29/619; 219/544; 219/548; 425/549
[58] Field of Search ............... 29/611, 619; 425/549; 219/523, 544, 548

[56] References Cited

U.S. PATENT DOCUMENTS

| | | | |
|---|---|---|---|
| 4,376,244 | 3/1988 | Gellert | 219/523 |
| 4,611,394 | 9/1988 | Gellert | 29/611 |
| 4,768,283 | 9/1988 | Gellert | 29/611 |
| 4,777,348 | 10/1988 | Gellert | 219/523 |
| 4,837,925 | 6/1989 | Gellert | 29/611 |

Primary Examiner—P. W. Echols

[57] ABSTRACT

A method of manufacturing a metallurgically monolithic integral heated probe for injection molding. An electrical terminal and three portions of the probe body are made and assembled together with an electrical heating element extending in an aligned bore. The forward portion is made of abrasion resistant high speed steel, while the rest of the probe body is made of hot work tool steel. A removable and reusable filler tube is screwed into a threaded seat in the rear cap portion and a quantity of silver is loaded into it. After a nickel alloy brazing material is applied to the joins, the assembly is heated in a reduced oxygen atmosphere in a vacuum furnace according to a predetermined cycle. The nickel alloy seals all the joins and the silver braze fills all the spaces between the components to provide a metallurgically monolithic integral probe. Using silver which is more conductive and has a lower melting temperature than copper reduces the cycle time and avoids having to heat the assembly into the austenitizing range of the steel body.

8 Claims, 4 Drawing Sheets

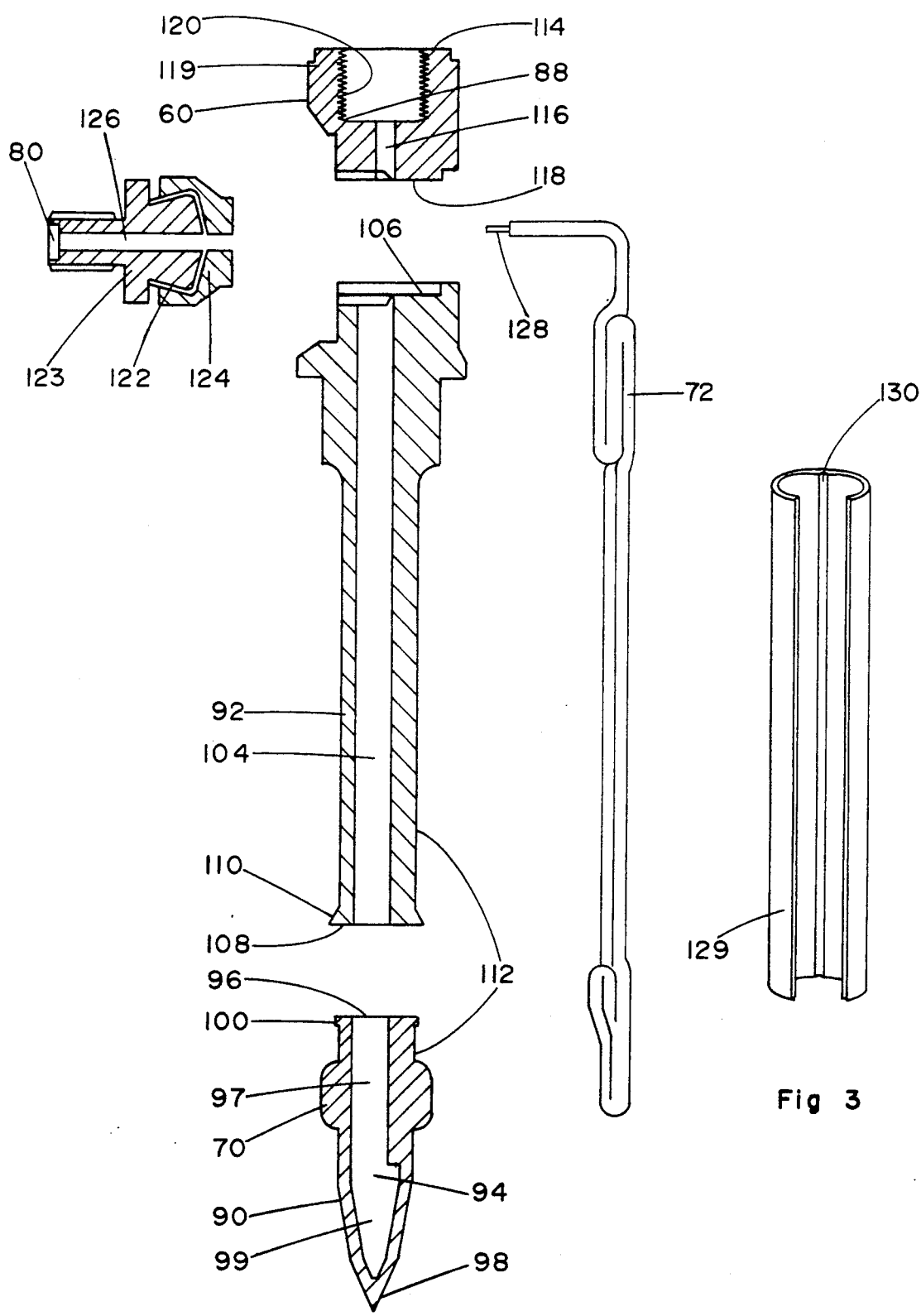

METHOD OF MANUFACTURING AN INJECTION MOLDING PROBE

BACKGROUND OF THE INVENTION

The invention relates to injection molding and more particularly to an improved method of manufacturing a metallurgically monolithic integral elongated heated probe.

Heated probes which extend into a melt passage to heat the melt flowing around them are well known in the art. It is also known to make these probes by integrally casting a heating element into a steel body, but all of the previous methods have one or more disadvantages. For instance, the applicant's U.S. Pat. No. 4,376,244 which issued Mar. 8, 1983 discloses a method of casting a copper slug around a cartridge heater from the rear, but it has the disadvantage that two separate heating steps in the vacuum furnace are required rather than only one. The applicant's U.S. Pat. No. 4,777,348 which issued Oct. 11, 1988 similarly relates to copper and requires two separate heating steps and also requires drilling a diagonal filler duct from the filler tube. While it shows the body of the probe being machined with a separate nose portion, they are both made of H13 tool steel which is not sufficiently abrasion resistant in the tip area for some applications. In order to cast the heating element in copper, the probe must be heated above the melting temperature of copper at 1981° F. This has the disadvantage that it is above the austenitizing range of the steel body and results in it having lower yield strength. Also, the filler tubes were brazed or welded in place and had to be machined off and so were not reusable.

More recently, the applicant's Canadian patent application serial number 2,032,728-6 filed Dec. 19, 1990 hentitled "Injection Molding Probe with Varying Heat Profile" discloses a method of integrally brazing the heating element in a nickel alloy. In addition to being filled from the forward end, this method has the disadvantage that the alloy is not sufficiently conductive to provide the very rapid cycle times required to be competitive. The applicant's Canadian patent application serial number 2,037,186-2 filed Feb. 28, 1991 entitled "Injection Molding Probe with a Longitudinal Thermocouple Bore and Off Center Heating Element" similarly has the disadvantage that the heating element is cast in an alloy which is not sufficiently conductive for some applications.

SUMMARY OF THE INVENTION

Accordingly, it is an object of the present invention to at least partially overcome the disadvantages of the prior art by providing a method of manufacturing a metallurgically monolithic integral injection molding heated probe wherein two different materials having different characteristics are used to make different portions of the body and a removable reusable filler tube is used to braze fill highly conductive silver around the electrical heating element from the rear end of the body.

To this end, in one of its aspects, the invention provides a method of manufacturing a metallurgically monolithic integral injection molding heated probe having an elongated outer body with a rear end and a forward end, an electrically insulated heating element extending longitudinally in the body from an external electrical terminal adjacent the rear end of the body, and a thermocouple bore extending longitudinally in the body adjacent the heating element, comprising the steps of:

(a) forming a hollow steel forward portion of the body having a bore extending from an open rear end to a closed forward end, (b) forming a steel central elongated sleeve portion of the body having a rear end and a forward end with a heating element bore extending longitudinally therethrough from the rear end to the forward end, (c) forming a rear hollow steel cap portion of the body having a rear end and a forward end, the cap portion having a threaded cylindrical seat extending forwardly from the rear end, the cap portion having a bore extending longitudinally therethrough from the seat to the forward end, (d) forming an electrical terminal to be mounted adjacent the rear end of the body, the electrical terminal having an opening to receive therein a bared end of the electrical heating element in electrical connection with the electrical terminal, the electrical terminal having insulation to electrically insulate the electrical terminal from the body, (e) inserting the electrical heating element into the heating element bore of the sleeve portion of the body and assembling the forward portion of the body, the central sleeve portion of the body, and the rear cap portion of the body in position wherein the bores are longitudinally aligned to form the body and mounting the electrical terminal adjacent the rear end of the body, wherein said bared end of the electrical heating element extends into the opening in the electrical terminal, (f) applying brazing material along the joins between the electrical terminal and the forward portion, central sleeve portion and rear cap portion of the body, (g) screwing a threaded filler tube into the threaded cylindrical seat in the rear cap portion of the body, the filler tube having a hollow bore leading to the bore through the rear cap portion of the body, and loading a predetermined quantity of silver into the hollow bore of the filler tube, (h) inserting the assembled body, electrical terminal and filler tube in an upright position into a vacuum furnace and heating to predetermined temperatures in a reduced oxygen atmosphere according to a predetermined cycle to melt the brazing material to braze the electrical terminal and the portions of the body together and to melt the silver which flows downwardly around the heating element to braze fill the bore in the forward portion of the body, the heating element bore in the central sleeve portion of the body and, the bore in the rear cap portion of the body to form a probe having a metallurgically monolithic integral structure, and (i) removing the filler tube from the threaded seat in the rear cap portion of the body and machining a thermocouple bore to extend from the seat through the rear cap portion of the body and the central sleeve portion of the body into the silver which fills the bore in the forward portion of the body.

BRIEF DESCRIPTION OF THE DRAWINGS

FIG. 2 is an exploded sectional view of most of the components of the in position for assembly, FIG. 3 is an isometric view of a filler sleeve which fits around a central section of the electrical heating element.

DETAILED DESCRIPTION OF THE DRAWINGS

Figure 1:
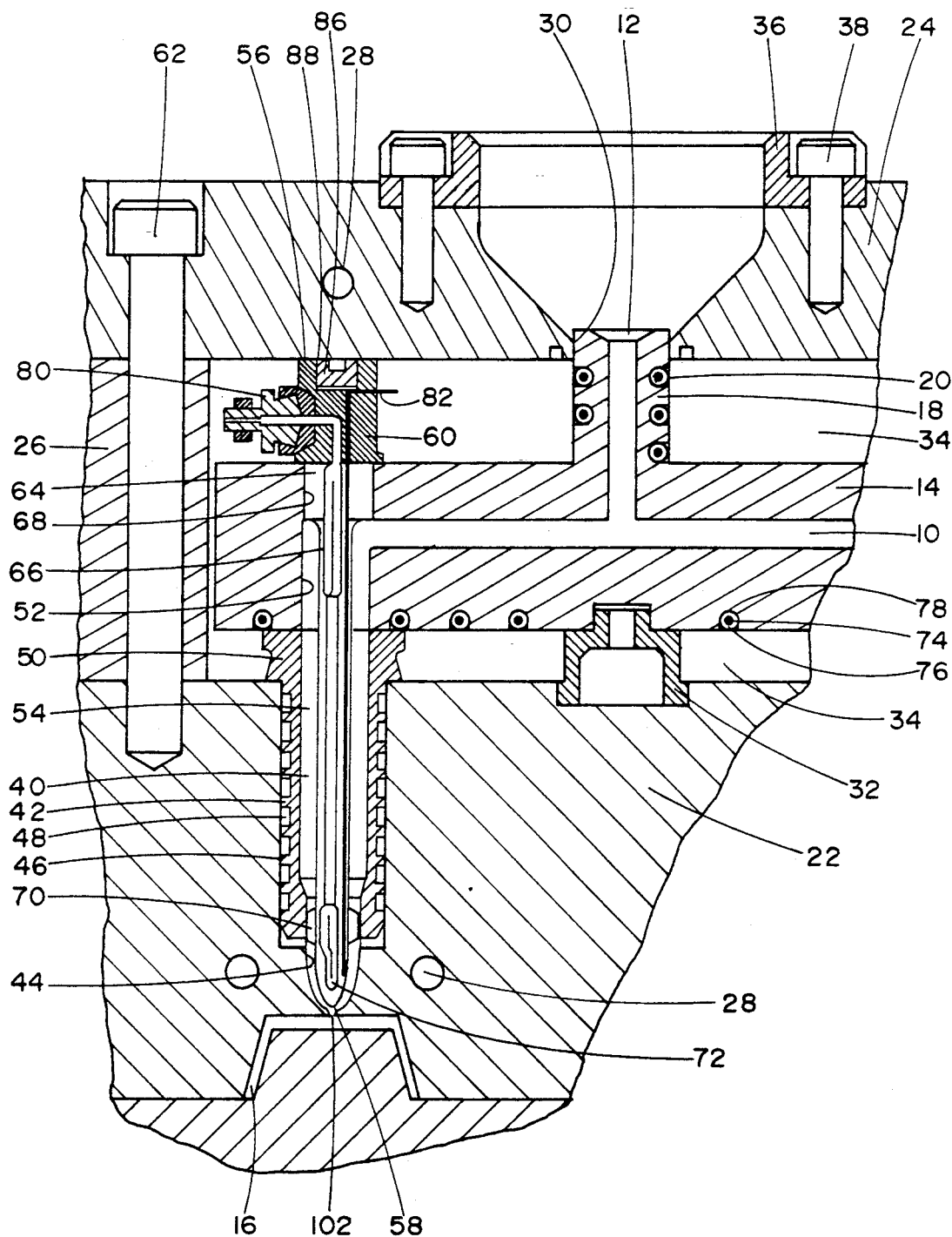
FIG. 1 is a sectional view of a portion of a multi-cavity injection molding system showing a probe manufactured according to a preferred embodiment of the invention.

Reference is first made to FIG. 1 which shows a portion of a hot tip gated multi-cavity injection molding system. A melt passage 10 branches from an inlet 12 in a heated melt distribution manifold 14 to convey pressurized melt to each cavity 16. The melt distribution manifold 14 has an integral heated inlet portion 18 and an electrical heating element 20 as described in Mold-Masters Canadian patent application serial number 2,044,793-1 filed Jun. 13, 1991 entitled "Injection Molding Manifold with Integral Heated Inlet Portion." The manifold 14 extends between a cavity plate 22 and a back plate 24 which are separated by a spacer plate 26. These plates are cooled by pumping cooling water through cooling conduits 28. The manifold 14 is accurately centrally located in this position by the cylindrical inlet portion 18 extending through a matching opening 30 in the back plate 24 and by a central locating ring 32 which is seated between it and the cavity plate 22. As can be seen, this provides an insulative air space 34 between the heated manifold 14 and the surrounding cooled plates. A circular collar 36 is secured in a seat in the back plate 24 by bolts 38.

The system or apparatus according to the invention has a number of heated probes 40 which are made by the method according to the invention as described in detail below. Each probe 40 extends through a sealing sleeve 42 and into a well 44 in the cavity plate 22. Each sealing sleeve 42 has a ridged outer surface 46 which provides insulative air grooves 48 between it and the surrounding cavity plate 22. Each sealing sleeve 42 also has a larger diameter rear collar portion 50 which extends between the manifold 14 and the cavity plate 22 to prevent leakage of pressurized melt from the melt passage 10 into the air space 34. The inner diameter of the sealing sleeve 42 is the same as the diameter of the adjacent bore 52 in the manifold 14 which is large enough to form the portion of the melt passage 10 which extends around the heated probe 40.

Each probe 40 has an elongated outer body 54 with a rear end 56 and a forward end 58. In this embodiment of the invention the forward end 58 is made with a pointed tip, but in other embodiments it may be made with other shapes suitable for other types of gating such as angle tip or hot edge gating. The outer body 54 of each probe 40 has a rear cap portion 60 which extends between the manifold 14 and the back plate 24. The back plate 24 is secured in position by bolts 62 which extend through the spacer plate 26 into the cavity plate 22. The back plate 24 thus applies a force to the rear ends 56 of the probes 40 which holds the probes 40, manifold 14 and sealing sleeves 42 securely in position. The outer body 54 of each probe 40 also has an intermediate portion 64 extending between the larger diameter rear cap portion 60 and a smaller diameter forward portion 66. The intermediate portion 64 is just long enough to extend to the melt passage 10, and its diameter is just large enough to fit precisely in the matching portion 68 of the bore 52 through the manifold 14 to prevent leakage of the pressurized melt between them.

As described in the applicant's Canadian patent application 2,037,186-2 mentioned above, the forward portion 66 of each probe 40 has four equally spaced fins 70 which project outwardly to contact the sealing sleeve 42 to accurately locate the probe 40 at the operating temperature. The melt flows between the fins 70 which are smoothly shaped to avoid any dead spots in the flowing melt. Each probe 40 also has a longitudinally extending electrical heating element 72 which is integrally brazed into the outer steel body 54. In this embodiment, the heating element 72 has a nickel-chrome resistance wire 74 extending through a refractory powder 76 such as magnesium oxide in a steel casing 78. The heating element 72 is bent back upon itself in a predetermined configuration to provide a number of longitudinal sections having different numbers of multiple runs of the heating element 72 to give the probe 40 a varying heat profile along its length as shown in the applicant's Canadian patent application 2,032,728-6 mentioned above. The heating element 72 extends radially outward to an external electrical terminal 80 adjacent the rear end 56 of the body 54 of the probe 40. A removable thermocouple wire 82 extends into a thermocouple bore 84 which extends longitudinally in the probe 40 beside the heating element 72 to monitor the operating temperature adjacent the forward end 58 of the probe 40. The removable thermocouple wire 82 is held in place by a retaining plug 86 which is screwed into a threaded seat 88 in the cap portion 60 of the probe 40.

Figures 4, 5:
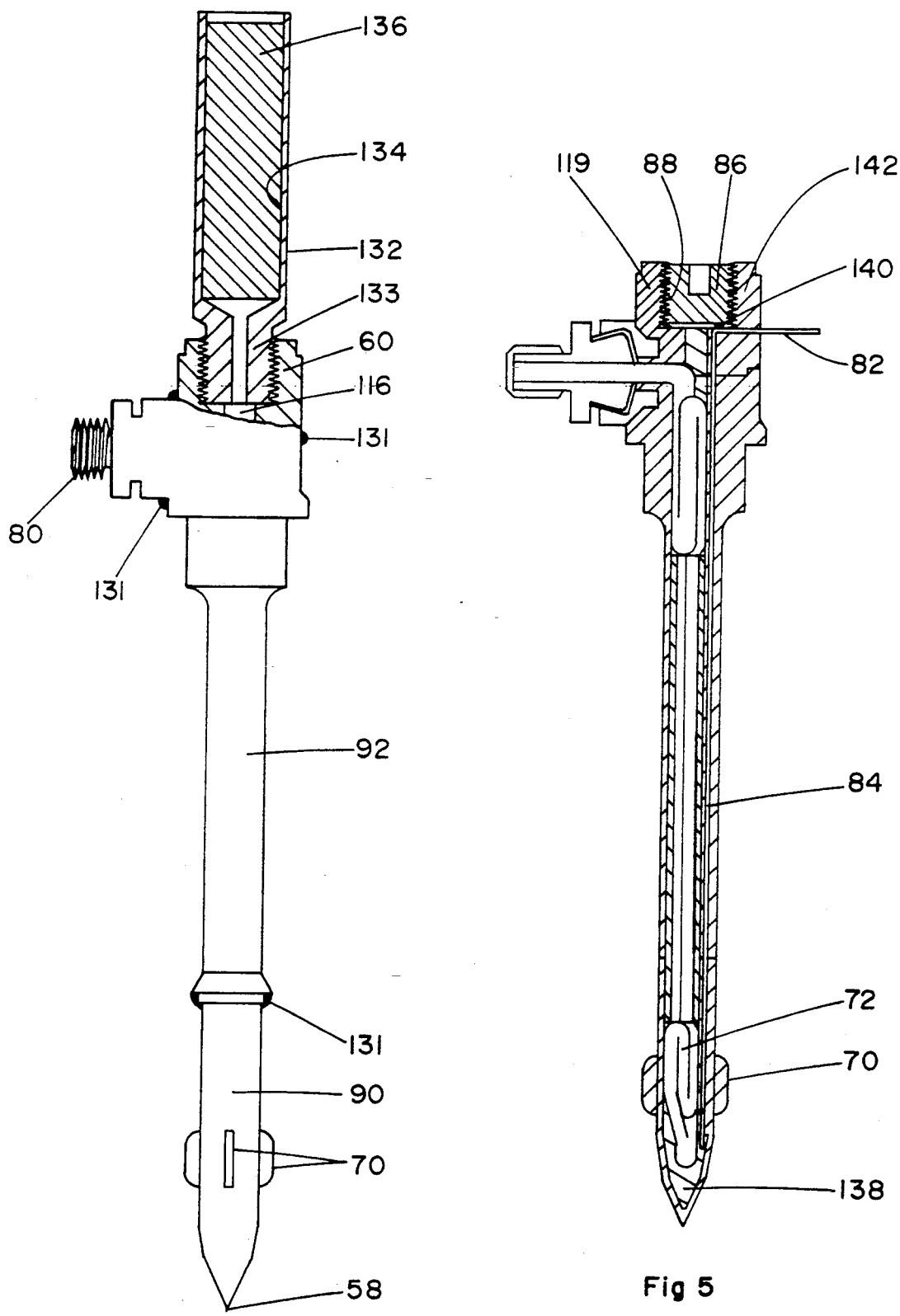
FIG. 4 is a partial sectional view showing the removable filler tube containing the silver mounted in position for brazing in the vacuum furnace.
FIG. 5 is a sectional view of the completed probe.

Reference will now be made to FIGS. 2-4 to describe the method of making the heated probes 40 according to a preferred embodiment of the invention. The three components of the outer body 54 of the probe 40, the forward portion 90, the central sleeve portion 92, and the rear cap portion 60 are machined of the general shape seen in FIG. 2, although the actual dimensions may vary for different applications. The hollow forward portion 90 is made of a high speed steel with a bore 94 extending longitudinally from an open rear end 96 to a closed forward end 98. The bore 94 has a smaller diameter portion 97 extending from the rear end 96 to a larger diameter portion 99 at the forward end. In this embodiment, the forward portion 90 is machined to shape the forward end 98 as a pointed tip prior to assembly, but this may alternately be done after the probe is integrally brazed together. As mentioned above, the forward portion 90 may be made with other shapes for other types of gating. In this embodiment, the rear end 96 of the forward portion 90 is made with an outer flange 100 to facilitate brazing it to the central sleeve portion 92. The forward portion 90 is also made with the four spaced fins 70 between which the melt flows to each gate 102 leading to the cavity 16.

The elongated central sleeve portion 92 is made of a hot work tool steel such as H13 with a heating element bore 104 extending longitudinally from a rear end 106 to a forward end 108. The forward end 108 is also made with an outer flange 110 to facilitate brazing it to the forward portion 90. The forward portion 90 and the central sleeve portion 92 are made so their outer surfaces 112 form the intermediate portion 64 of the body 54 of the probe 40 and the smaller diameter forward portion 66 of the body 54 of the probe 40 which extends between the intermediate portion 64 and the forward end 58 of the outer body 54 of the probe. The central sleeve portion 92 also is shaped adjacent its rear end 106 to receive the electrical terminal 80 described below.

The rear cap portion 60 is also made of a hot work tool steel such as H13 with a cylindrical seat 88 extending forwardly from the rear end 114. The cap portion 60 is made with a bore 116 extending longitudinally from the seat 88 to the forward end 118. The cylindrical seat 88 is made with a surrounding rim portion 119 having inwardly directed threads 120. The rear cap portion 60 is also shaped adjacent its forward end 118 to receive the electrical terminal 80.

The electrical terminal 80 is made by the method described in the applicant's U.S. Pat. No. 4,837,925 which issued Jun. 13, 1989. A coating 122 of magnesium oxide or other suitable insulating material is applied between the steel terminal body 123 and a steel protective cap 124. The electrical terminal 80 is made with an opening 126 to receive therein a bared end 128 of the heating element 72 to be in electrical connection with the terminal body 123.

In this embodiment, the electrical heating element 72 is made by a method similar to that described and illustrated in the applicant's Canadian patent application serial number 2,032,728-6 referred to above. It is bent back upon itself a number of times and swaged in die to have a number of longitudinal sections with different numbers of multiple runs of the heating element to give the probe 40 a predetermined heat profile along its length. However, in this case, as seen in FIG. 3, the steel filler sleeve 129 has a longitudinal hinge portion 130 so it can be crimped over the thinner middle section after it is swaged rather than slipped on from one end before the heating element is bent.

The forward portion 90 and central sleeve portion 92 are assembled with the heating element 72 received in their bores 94, 104. The filler sleeve 129 locates the smaller diameter portion 97 of the bore 94 of the forward tip portion 90 in alignment with the heating element bore 104 of the central sleeve portion 92. The rear cap portion 60 is also assembled with its bore 116 in longitudinal alignment and they are tack welded together with the electrical terminal 80 which is mounted with the bared end 128 of the heating element 72 received in its opening 128. A bead 131 of a suitable brazing material such as nickel alloy is applied along the joins between the electrical terminal 80 and the three portions 90, 92, 60 of the probe body 54. A filler tube 132 having a threaded end 133 which matches the threads 120 of the cylindrical seat 88 is screwed into the rear cap portion 60 of the probe body 54. The filler tube 132 has a hollow bore 134 in alignment with the bores 94, 104, 116 of the assembled portions 90, 92, 60 of the probe body 54, and a predetermined quantity of silver 136 is then loaded into the hollow bore 134 of the filler tube 132.

Figure 6:
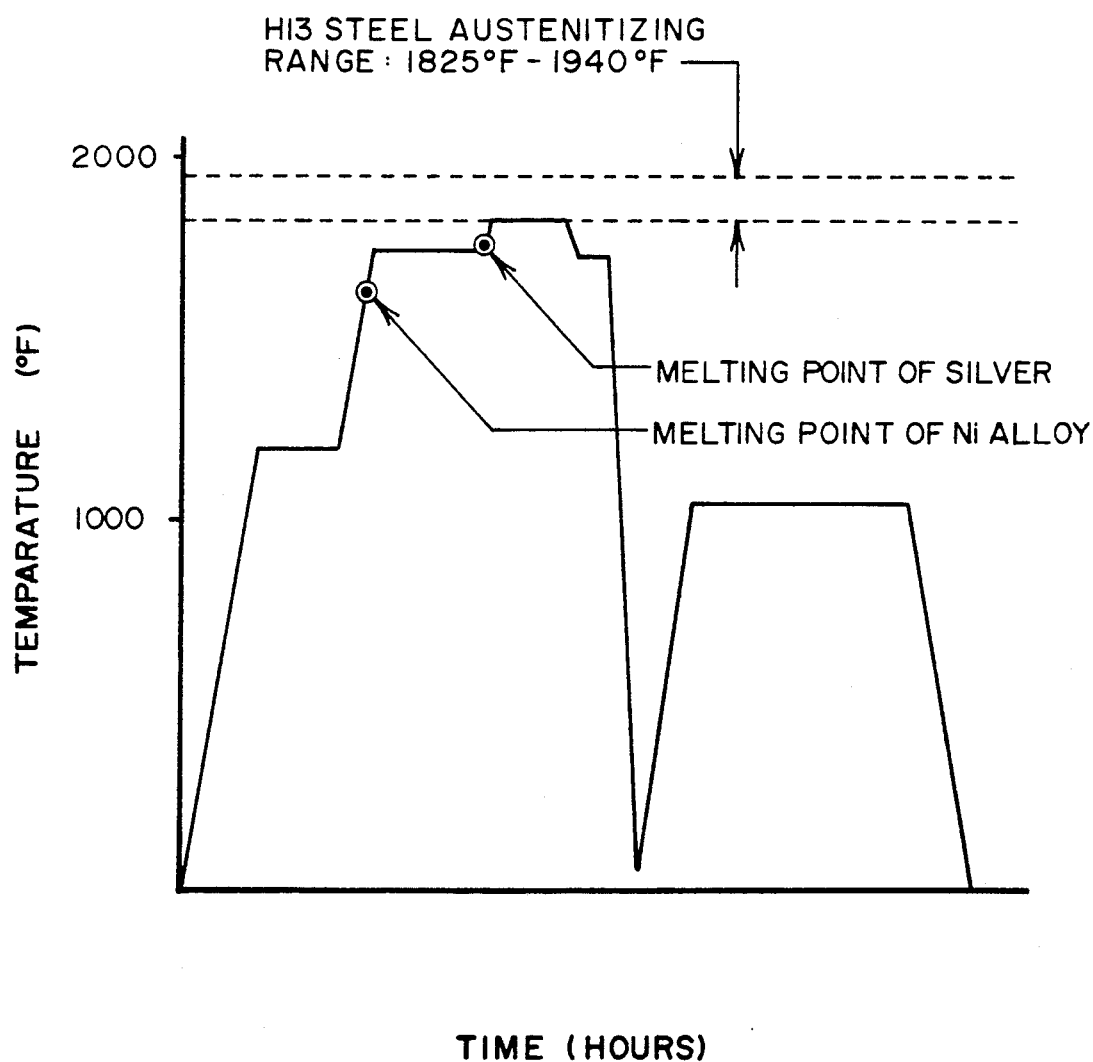
FIG. 6 is a graph illustrating the heat treating cycle in the vacuum furnace

The assembled probe body 54, electrical terminal 80, and filler tube 132, is then inserted into a vacuum furnace and heated above the melting temperatures of the brazing material and silver according to a predetermined cycle, as shown in FIG. 6. As the furnace is gradually heated, it is evacuated to a relatively high vacuum to remove substantially all of the oxygen. Before the melting point of the nickel alloy brazing material is reached, the vacuum is reduced by partially backfilling with an inert gas such as argon or nitrogen. When the nickel alloy melts, it flows by capillary action to seal the joins between the various components. When the silver melts, it flows downwardly to braze fill the aligned bores 94, 104, 116 of the three portions 90, 92, 60 of the probe body 54 around the heating element 72. This brazing in the vacuum furnace provides a metallurgical bonding of the nickel alloy to the steel and of the silver to the heating element 72 and the surrounding probe body 54 to form the metallurgically monolithic integral heated probe 40. In this embodiment, a nipple 138 having a substantial volume of silver is formed between the heating element 72 and the closed forward end 98 of the probe body 54. This ensures that temperature changes at the forward end 58 of the body 54 of the probe 40 will be both rapid and uniform around all sides of the pointed tip.

After the probe 40 is cooled and removed from the vacuum furnace, the filler tube 132 is unscrewed for reuse and the probe is machined to remove the flanges 100, 110 and to provide a predetermined outer shape and finish. The rim portion 119 of the seat 88 in the rear cap portion 60 is machined to have a radial hole to receive a ground wire 140 and a radial thermocouple groove 142. The thermocouple bore 84 is machined to extend from the seat 88 into the silver filling the bore 94 in the forward portion 90 of the probe body 54. The thermocouple wire 82 can then be inserted into the thermocouple bore 84 and bent outwardly through the groove 142 in the rim portion 119. The threaded plug 86 is then screwed into the threaded seat 88 to hold the ground wire 142 and the thermocouple wire 82 securely in place. The threaded seat 88 can also be used to receive a threaded tool to pull the probe 40 out of the bore 52 of the manifold 14 for repair or replacement if necessary.

In use, the injection molding system or apparatus is assembled as shown in FIG. 1. Electrical power is applied to the heating element 20 in the manifold 14 and the heating element 72 in each probe 40 to heat them to a predetermined operating temperature. Pressurized melt from a molding machine (not shown) is then injected into the melt passage 10 through the common inlet 12 in the manifold inlet portion 18 according to a predetermined cycle in a conventional manner. The pressurized melt flows along around each heated probe 40 and through the gates 102 to fill the cavities 16. After the cavities 16 are filled, injection pressure is held momentarily to pack and then released. After a short cooling period, the mold is opened to eject the molded products. After ejection, the mold is closed and injection pressure is reapplied to refill the cavities. This cycle is continuously repeated with a frequency dependent on the size and shape of the cavities and the type of material being molded. In some applications, the temperature in the areas of the gates is cycled to provide effective thermal gating. The power to the heating elements 72 is switched off just after packing. The heat in the gate and cavity areas is quickly dissipated by the cooling water and the gates 102 freeze off to provide a clean break. Power is reapplied to the heating elements 72 just before the mold is closed. This rapidly heats the solidified melt in the gates 102 so they open immediately when melt injection pressure is reapplied after the mold is closed. Making the forward portion 90 and the central sleeve portion 92 of the probe body 54 of different materials has several advantages. The high speed steel of the forward portion 90 is sufficiently resistant to abrasion which is otherwise quite a problem in the area adjacent the gate in some applications. On the other hand, making the rest of the probe body 54 of tool steel avoids it being too brittle, which would be the case if it were all made of high speed steel. Braze filling the heating element in silver rather than copper or a nickel alloy provides the advantage that silver is very thermal conductive which allows cycle times to be reduced. Also, it has a melting temperature below the austenitizing range of tool steel which avoids the probe body 54 being weakened during the braze filling step.

While the description of making the probes 40 has been given with respect to a preferred embodiment, it is not to be construed in a limiting sense. Variations and modifications will occur to those skilled in the art. Reference is made to the appended claims for a definition of the invention.

The embodiments of the invention in which an exclusive property or privilege is claimed are defined as follows:

1. A method of manufacturing a metallurgically monolithic integral injection molding heated probe having an elongated outer body with a rear end and a forward end, an electrically insulated heating element extending longitudinally in the body from an external electrical terminal adjacent the rear end of the body, and a thermocouple bore extending longitudinally in the body adjacent the heating element, comprising the steps of:
   (a) forming a hollow steel forward portion of the body having a bore extending from an open rear end to a closed forward end,
   (b) forming a steel central elongated sleeve portion of the body having a rear end and a forward end with a heating element bore extending longitudinally therethrough from the rear end to the forward end,
   (c) forming a rear hollow steel cap portion of the body having a rear end and a forward end, the cap portion having a threaded cylindrical seat extending forwardly from the rear end, the cap portion having a bore extending longitudinally therethrough from the seat to the forward end,
   (d) forming an electrical terminal to be mounted adjacent the rear end of the body, the electrical terminal having an opening to receive therein a bared end of the electrical heating element in electrical connection with the electrical terminal, the electrical terminal having insulation to electrically insulate the electrical terminal from the body,
   (e) inserting the electrical heating element into the heating element bore of the sleeve portion of the body and assembling the forward portion of the body, the central sleeve portion of the body, and the rear cap portion of the body in position wherein the bores are longitudinally aligned to form the body and mounting the electrical terminal adjacent the rear end of the body, wherein said bared end of the electrical heating element extends into the opening in the electrical terminal,
   (f) applying brazing material along the joins between the electrical terminal and the forward portion, central sleeve portion, and rear cap portion of the body,
   (g) screwing a threaded filler tube into the threaded cylindrical seat in the rear cap portion of the body, the filler tube having a hollow bore leading to the bore through the rear cap portion of the body, and loading a predetermined quantity of silver into the hollow bore of the filler tube,
   (h) inserting the assembled body, electrical terminal, and filler tube in an upright position into a vacuum furnace and heating to predetermined temperatures in a reduced oxygen atmosphere according to a predetermined cycle to melt the brazing material to braze the electrical terminal and the portions of the body together and to melt the silver which flows downwardly around the heating element to braze fill the bore in the forward portion of the body, the heating element bore in the central sleeve portion of the body, and the bore in the rear cap portion of the body to form a probe having a metallurgically monolithic integral structure, and
   (i) removing the filler tube from the threaded seat in the rear cap portion of the body and machining a thermocouple bore to extend from the seat through the rear cap portion of the body and the central sleeve portion of the body into the silver which fills the bore in the forward portion of the body.

2. A method of manufacturing a metallurgically monolithic integral injection molding heated probe as claimed in claim 1 wherein a portion of the electrical heating element extends into the bore in the forward portion of the body.

3. A method of manufacturing a metallurgically monolithic integral injection molding heated probe as claimed in claim 2 including forming the forward portion of high speed steel and forming the central sleeve portion of tool steel.

4. A method of manufacturing a metallurgically monolithic integral injection molding heated probe as claimed in claim 3 further comprising the step of machining the probe to provide a predetermined outer shape and finish.

5. A method of manufacturing a metallurgically monolithic integral injection molding heated probe as claimed in claim 4 including machining the probe to shape the forward end to form a pointed tip.

6. A method of manufacturing a metallurgically monolithic integral injection molding heated probe as claimed in claim 1 wherein the brazing material is nickel alloy.

7. A method of manufacturing a metallurgically monolithic integral injection molding heated probe as claimed in claim 1 further comprising the steps of making the rear cap portion with a rearwardly extending threaded rim portion having a thermocouple groove extending radially therethrough, inserting a thermocouple wire into the thermocouple bore to extend outwardly through the thermocouple groove, and screwing a retaining plug into the threaded seat to securely retain the thermocouple wire in position.

8. A method of manufacturing a metallurgically monolithic integral injection molding heated probe as claimed in claim 1 further comprising making the heating element with a number of longitudinal sections having different numbers of multiple runs of the heating element, and crimping a hinged filler sleeve over at least one of the longitudinal sections.

* * * * *